United States Patent [19]

Tadokoro et al.

[11] 3,987,900
[45] Oct. 26, 1976

[54] JACKET FOR MAGNETIC DISC MEMORY

[75] Inventors: Eiichi Tadokoro; Akira Ishii; Tatsuji Kitamoto; Osamu Suzuki, all of Odawara, Japan

[73] Assignee: Fuji Photo Film Co., Ltd., Minami-ashigara, Japan

[22] Filed: Aug. 22, 1975

[21] Appl. No.: 606,786

[30] Foreign Application Priority Data
Aug. 23, 1974    Japan.............................. 49-101770

[52] U.S. Cl.................................. 206/313; 206/54; 206/409; 206/444; 206/449
[51] Int. Cl.²....................................... B65D 85/30
[58] Field of Search............ 206/309, 311, 312, 313, 206/444, 303, 476, 409, 54, 449

[56] References Cited
UNITED STATES PATENTS

| | | | |
|---|---|---|---|
| 2,471,173 | 5/1949 | Taylor................................ | 206/303 |
| 2,500,773 | 3/1950 | Robins............................... | 206/311 |
| 2,652,922 | 9/1953 | Schweich........................... | 206/303 |
| 2,832,466 | 4/1958 | Sheard................................ | 206/303 |
| 3,102,635 | 9/1963 | Werwin et al. ..................... | 206/313 |

FOREIGN PATENTS OR APPLICATIONS

| | | | |
|---|---|---|---|
| 371,651 | 5/1922 | Germany ........................... | 206/476 |
| 555,632 | 7/1932 | Germany ........................... | 206/312 |
| 322,643 | 12/1929 | United Kingdom................ | 206/303 |

*Primary Examiner*—William Price
*Assistant Examiner*—Joseph M. Moy
*Attorney, Agent, or Firm*—Gerald J. Ferguson, Jr.; Joseph J. Baker

[57]    ABSTRACT

A foldable jacket made of a sheet material of rectangular shape and folded at the central portion thereof to form a square base sheet and a square cover sheet. The cover sheet is provided with a cut-away portion extending from an edge opposite to the folded edge to the central part thereof. The base sheet is provided with a disc holding portion at the central part thereof to be engaged with a central hole of the disc. The disc holding portion is composed of a stem portion and engaging portions. The engaging portions are made flexible and releasably engaged with the hole of the disc.

4 Claims, 3 Drawing Figures

U.S. Patent  Oct. 26, 1976  3,987,900
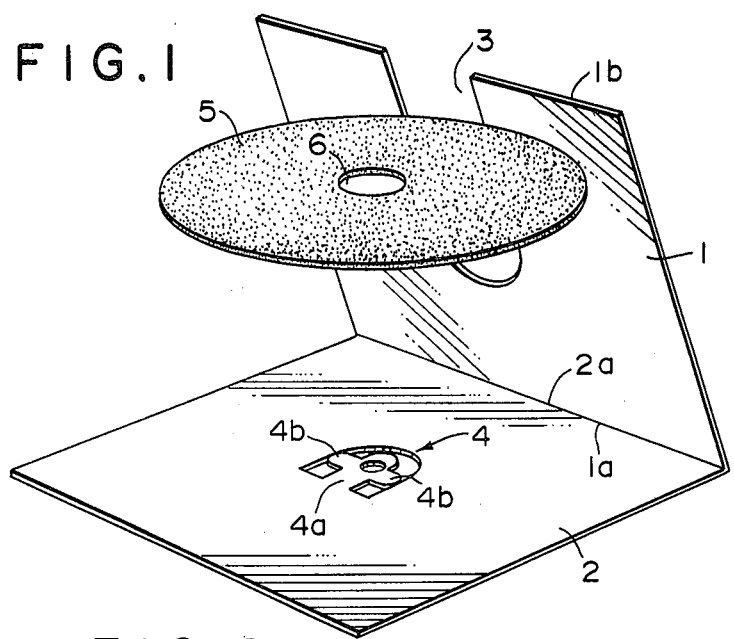
FIG. I
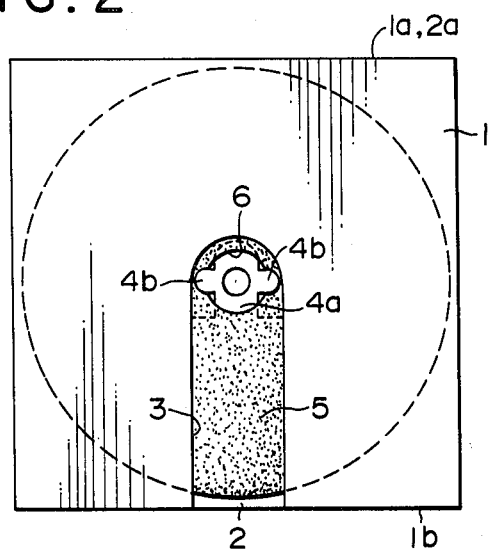
FIG. 2
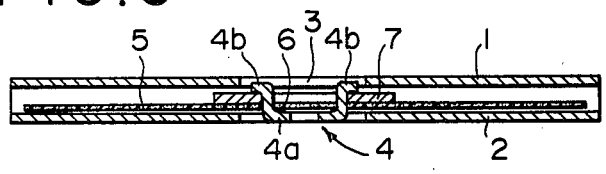
FIG. 3

JACKET FOR MAGNETIC DISC MEMORY

BACKGROUND OF THE INVENTION

1. Field of the Invention

This invention relates to a jacket for a magnetic disc, and more particularly to a jacket for retaining a flexible magnetic disc memory.

2. Description of the Prior Art

The jacket for retaining a magnetic disc memory is required to have means for securely holding the disc therein. It has been known in the art to make the width of a rectangular jacket substantially equal to the diameter of the magnetic disc so that the magnetic disc may not move in the jacket. Further, it has been known to make a part of the disc adhered to the internal surface of the jacket by use of adhesive.

The above described jackets with disc holding means are disadvantageous in that the disc is difficult to be inserted into the jacket or the adhesive will possibly stick to the surface of the magnetic disc and cause the surface to be scratched.

In the jacket without the disc holding means, the disc will move freely and the surface thereof is apt to be scratched of course. Further, when the disc moves in the jacket, the disc is apt to be bent or curved.

SUMMARY OF THE INVENTION

In view of the above described defects inherent in the conventional jackets for retaining a magnetic disc memory, the primary object of the present invention is to provide a jacket for retaining a magnetic disc memory which is easy to handle and in which the magnetic disc is effectively prevented from moving.

Another object of the present invention is to provide a jacket for retaining a magnetic disc memory wherein the magnetic disc is effectively protected from being scratched or bent.

Still another object of the present invention is to provide a jacket for retaining a magnetic disc memory wherein the magnetic disc can be taken out without touching the disc surface and accordingly there is no fear of damaging the disc by hand touch.

A further object of the present invention is to provide a jacket for retaining a magnetic disc memory which can be manufactured at a low cost.

The jacket in accordance with the present invention is characterized in that a cover sheet is provided with a cut-away portion to expose the central portion of the disc with a central hole, and a base sheet is provided with a disc holding portion comprising foldable engaging tabs to be engaged with the central hole of the disc. Said cut-away portion extends from the center of the cover sheet to an edge thereof so that the magnetic disc can be loaded in a disc recorder with the cover sheet faced downward on a turn-table of the recorder. After the magnetic disc is placed on the turn-table with the jacket, the jacket is slid out of the turn-table leaving the magnetic disc on the turn-table. Thus, the magnetic disc can be loaded in a disc recorder without touching the disc itself.

BRIEF DESCRIPTION OF THE DRAWING

FIG. 1 is a perspective view showing an embodiment of the jacket for retaining a magnetic disc in accordance with the present invention with the cover thereof opened, FIG. 2 is a plan view of the jacket as shown in FIG. 1 which is in the folded state with a magnetic disc retained therein, and FIG. 3 is a cross sectional view showing another embodiment of the jacket in accordance with the present invention.

DESCRIPTION OF THE PREFERRED EMBODIMENTS

Referring to FIG. 1, the jacket in accordance with the present invention comprises a cover sheet 1 and a base sheet 2 hinged thereto at an edge thereof. The cover sheet 1 and the base sheet 2 are both square shaped and are hinged to each other at an edge thereof 1a, 2a. The cover sheet 1 and the base sheet 2 are made of a rectangular sheet material folded at the central part thereof. The sheet material may be of plastic, paper or thin metal, and the thickness thereof is preferably 0.1 to 3mm, more preferably 0.25 to 1mm. The cover sheet 1 is provided with a cut-away portion 3 extending from the edge 1b thereof opposite to said hinged edge 1b to the central part thereof. The width of the cut-away portion 3 is made not less than the diameter of the central hole 6 of a magnetic disc 5 to be retained by the jacket. The base sheet 2 is provided at the central part thereof with a disc holding portion 4 comprising a stem portion 4a and a pair of engaging portions 4b to be engaged with the central hole 6 of the disc 5. The engaging portions 4b are able to be bent to be engaged with the central hole 6 of the disc 5 and the length thereof is made not less than the thickness of the disc 5 to be retained in the jacket. Although in the embodiment shown in FIGS. 1 and 2 a pair of engaging portions 4b are provided, the number of the engaging portions 4b is not limited to two but may be more than two. At least two engaging portions among those provided in the disc holding portion 4 are required to be apart from each other by more than 90° in order to securely hold the disc 5 therein.

When the disc 5 is put in the jacket, the engaging portions 4b are bent and the central hole 6 of the disc 5 is engaged with the engaging portions 4b and then the engaging portions 4b are flattened back to hold the disc 5. Then, the cover sheet 1 is folded to sandwich the disc 5 between the cover sheet 1 and the base sheet 2. If required, both side edges of the cover sheet 1 and the base sheet 2 may be fixed to each other to form an envelope-shaped jacket.

When the magnetic disc 5 is loaded in a disc player, the jacket with the disc 5 retained thereby is put on a turn-table of the player with the cover sheet 1 faced downward and the central hole 6 of the disc is put into engagement with an axle of the player. When the central hole 6 of the magnetic disc 5 is engaged with the axle (not shown) of the player, the stem portion 4a of the base sheet 2 is pushed upward and the engaging portions 4b are disengaged from the hole 6. Then, by pulling the jacket outward in the direction along the cut-away portion 3 with the hinged edge 1a, 2a directed ahead, the jacket can be taken out leaving the magnetic disc 5 on the turn-table of the player (not shown). Thus, the magnetic disc can be loaded in a player without touching the disc.

FIG. 3 illustrates another embodiment of the jacket in accordance with the present invention wherein a reinforcing ring is used in the jacket. In this embodiment, as shown in FIG. 3, a reinforcing ring 7 is engaged with the disc holding portion 4 together with the disc 5. In this embodiment, accordingly, the length of the engaging portions 4b of the disc holding portion 4 should not be less than the sum of the thickness of the disc 5 and that of the reinforcing ring 7.

In FIG. 3, all the elements equivalent to those shown in FIGS. 1 and 2 are indicated with the same reference numerals as those used for indicating the elements shown in FIGS. 1 and 2 and the description thereof is omitted here.

We claim:

1. A jacket for retaining a magnetic disc memory comprising a cover sheet of substantially square shape, and a base sheet of substantially the same size and shape as that of said cover sheet and hinged at an edge thereof to an edge of said cover sheet, said cover sheet having a cut-away portion extending from an edge thereof opposite to said hinged edge to the central part thereof, the width of said cut-away portion being not less than the diameter of a central hole of said magnetic disc, said base sheet having at the central part thereof a disc holding portion, said disc holding portion comprising a stem portion and a plurality of engaging portions connected with said stem portion, said engaging portions being engageable with said central hole of the magnetic disc.

2. A jacket for retaining a magnetic disc memory as defined in claim 1 wherein said engaging portions of said disc holding portion are flexible tabs which can be bent to be engaged with the hole of the disc.

3. A jacket for retaining a magnetic disc memory as defined in claim 2 wherein said tabs are formed to extend in the opposite directions to be engaged with the opposite sides of the central hole of the disc.

4. A jacket for retaining a magnetic disc memory as defined in claim 1 wherein a reinforcing ring is provided to sandwich the disc between the reinforcing ring and the base sheet, the reinforcing ring has a hole which is of substantially the same diameter as that of the central hole of the disc.

* * * * *